Feb. 10, 1942. H. GRAUMANN 2,272,663
METHOD OF PRETREATING CEREALS
Filed March 24, 1939
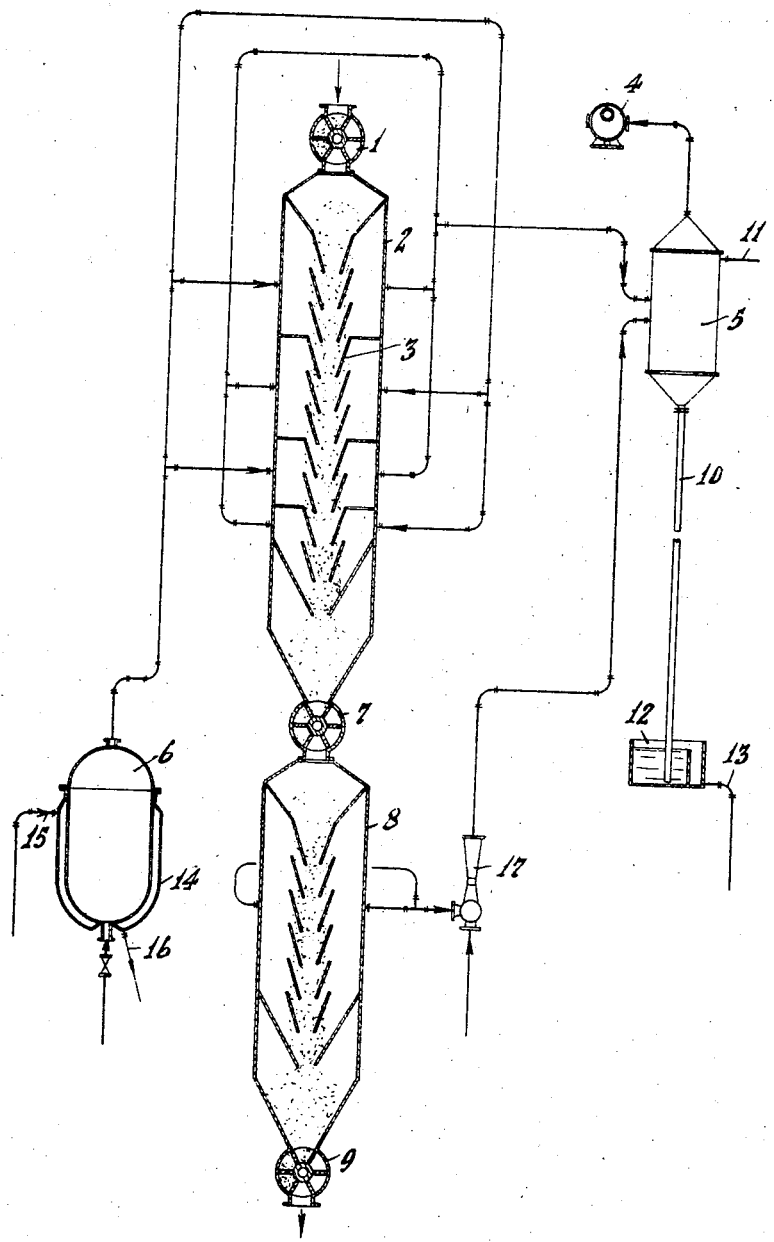

Patented Feb. 10, 1942

2,272,663

UNITED STATES PATENT OFFICE 2,272,663

METHOD OF PRETREATING CEREALS

Hermann Graumann, Santpoort, Netherlands, assignor to Wessanen's Koninklijke Fabrieken N. V., Wormerveer, Netherlands, a corporation of the Netherlands Application March 24, 1939, Serial No. 264,017
In Germany April 2, 1938

2 Claims. (Cl. 83—28)

The pre-treatment of cereals particularly of wheat and rye, with water at an elevated temperature which has been carried out for years according to different methods in the milling trade chiefly has for its purpose to toughen the husk of the grains in order to avoid too fine a comminution of the husk during the grinding process, and at the same time to render the kernel either more solid or more brittle, depending upon the nature thereof. The grain thereby becomes more suitable for being ground with the greatest yield of pure flour with a low ash-content. It has also been tried to exert a favorable influence on the baking properties of wheat and rye by this treatment, and some improvement in this direction has indeed been attained. This improvement, however, in the case of wheat has only been attained at working temperatures of above 115° F. by a hardening of the gluten, which, however, at the same time is "shortened" thereby, whereas the enzymes are generally weakened, the weakening effect being dependent upon working temperature and the degree of moisture of the wheat.

It has never been possible, however, by means of this method of pre-treatment—which generally requires a period of time between 45 minutes and 2 hours or more—either to obtain any considerable hardening of a soft gluten, without at the same time shortening the said gluten, or to increase the diastatic power, or to reduce the proteolytic properties, without exerting at the same time an unfavourable influence on the gluten.

Experiments have now shown that a hardening of the gluten, without at the same time shortening the same, is due to the inactivation of enzymes, lipoids and similar active substances and to the fact that the said substances are mainly present in the germ and in the aleuron cells of the wheat. It has likewise been found that the stability of the dough, obtained from rye, is considerably increased by an inactivation of the starch-decomposing enzymes, both after mixing and in the oven.

It is impossible to separate the germ and the aleuron cells completely from the flour during the grinding process, so that even in the least colored flours with the lowest possible ash-content there always will be present a certain proportion of the said constituents. According to the present invention, however, it has been found that the said unfavorably acting substances may be weakened at working temperatures of between 120 and 160° F. in the presence of a sufficient proportion of moisture, without shortening the gluten and without the starch being attacked, if treatment is carried out for a few minutes only, so that the heat applied will have no opportunity to penetrate into the interior of the kernel, where it would act directly upon the gluten and the starch, whereby the colloidal properties would be changed.

This fact has been verified by tests according to which moistened wheat was heated by an alternating current for a few minutes. Up to the present, however, this method had not been successfully adapted to actual practice, as the desired result is only obtained if the wheat is moistened with absolute uniformity. If this is not the case, a uniform increase in temperature cannot be obtained either, since it is the water, which has to produce the resistance required for the development of heat by the alternating current. It is very hard technically to obtain a perfectly uniform moistening, as this is a matter of differences of one hundredth parts of percents. It is difficult, moreover, to keep the cereals at the required temperature, since the said temperature may only vary within very narrow limits—the temperatures meant here generally vary between 120 and 160° F., the most favorable temperatures for the various kinds of wheat lying within a range of approximately 8–10° F., and being e. g. for hard wheat lower than for soft wheat—if one does not want to run the risk of the gluten or the starch being unfavorably influenced. This unfavorable influence is greater or smaller for different kinds of wheat, depending upon the moisture content of the internal portion of the grain.

It has now been found that the above difficulties may be easily overcome by a treatment of the wheat under vacuum, the said treatment consisting in passing water vapor under vacuum through the material for a period of a few minutes. A preliminary moistening of the cereal is not necessary and is generally undesired.

For this purpose the chamber in which the treatment is carried out is connected with a device for producing steam. In accordance with the degree of vacuum in the chamber where the cereal is treated it will be easily possible to obtain any desired temperature and to keep the same constant during the entire treatment. Since the material will enter the vacuum chamber at a low temperature, i. e. 50–68° F. at the highest, depending on the season, the steam when drawn through the cereal will condense immediately upon the surface of the grain and thereby will produce within a few minutes both the quantity of moisture required for the treatment and the heat required for obtaining the desired working temperature. The above will be further explained with the aid of an example.

Suppose that the treatment is carried out at a temperature of 140° F. and that the original temperature of the wheat is 60° F. Only the outer layers of the grain, that is 20% of the weight at the utmost, may be heated to the first mentioned temperature.

Theoretically it will therefore be necessary to supply to this layer—the specific heat of the wheat being 0.35 B. t. u. per lb.—560 B. t. u. for every 100 lbs. of wheat. In actual practice the supply of heat required may of course be either large or smaller, depending on the duration of the treatment and consequently on the distance over which the heat will penetrate into the grain. In general, however, the volume of heat to be supplied will not be materially different from the value mentioned above, since it is necessary to select the duration of the treatment so that only the outer portions of the grain will be influenced. It will now be found by calculation, that this volume of heat will be liberated by the condensation of 0.55 lb. of steam of 140° F. into water of 60° C. At the same time the moisture content of the grain is increased thereby, since the condensed water is absorbed in the outer layer. The increase in the moisture content only amounts to 0.55%, calculated on the total weight of the wheat, but in the vacuum treatment of the wheat this is sufficient for obtaining the desired result. It will therefore only be necessary to pass small quantities of steam through the grain.

To the vacuum chamber there is connected a condenser in order to maintain a constant vacuum and consequently a constant temperature of the steam, whereby also a constant working temperature is obtained. As soon as the wheat or the outer layers of the grains have attained the desired temperature, which may be ascertained by means of a thermometer introduced into the wheat and which will be the case after a few minutes, the treatment is stopped. In order to cool the outer layers of the grains to the temperature required for the further treatment, one may for example, evaporate entirely or partly under a higher vacuum the water absorbed by the husk, the heat required for this purpose being withdrawn from the grains.

In the accompanying drawing a device for carrying out the process according to the invention is diagrammatically illustrated by way of example in Fig. 1.

The wheat enters through the sluice 1 into the vacuum-treating apparatus 2 and travels downwardly through the said apparatus along a Venetian blind-like shaft 3. Transversely to the direction in which the wheat is moving, steam produced by the evaporator 6 is drawn via the condenser 5 through the wheat, by means of vacuum pump 4. The apparatus consists of a number of compartments which are separated by horizontal walls. In the first and third compartment the low pressure steam is supplied from the left side and withdrawn on the right side, whereas in the second and fourth compartment the steam is supplied from the right side, so as to obtain a uniform treatment of the whole stream of wheat.

By controlling the vacuum in the condenser and consequently also in the treating apparatus and in the evaporator, the desired temperature of the steam and consequently the desired working temperature, are obtained.

The wheat leaves the treating apparatus 2 through the sluice 7. The duration of the treatment may be controlled with the aid of the supply and discharge sluice. Through the sluice 7 the wheat will enter the vacuum apparatus 8. By means of a steam ejector 17 a high vacuum is created in the said apparatus, in order to evaporate completely or partially the water absorbed by the grains, and thereby to cool the heated material. The wheat is then discharged through the sluice 9.

The steam ejector which maintains the high vacuum in the apparatus 8, in general will act against the lower vacuum in the condenser 5. The said condenser may e. g. be an injection condenser with a barometric descending pipe 10, as indicated in the drawing. The numeral 11 then represents the water-supply for the injector of the injecting condenser 5. 12 denotes a water reservoir into which the end of pipe 10 is submerged, and which is provided with an overflow or a discharge pipe 13. The evaporator 6 is provided with a heating jacket 14 to which steam is supplied at 15, the condensate being discharged at 16.

I claim:

1. A method of treating wheat berries prior to milling for the purpose of weakening the enzymes and other active substances in the outer portions of the wheat, which comprises introducing unmoistened grain at a temperature of 50° F. to 68° F. into a closed chamber, treating the wheat for a period of a few minutes to a constant quality stream of saturated steam at its reduced pressure and of a temperature of 130° F. to 160° F., and controlling the flow of the steam during this short treatment period by a constant supply of fresh steam and constant evacuation of exhaust steam in such a manner that only sufficient steam is passed through the chamber as to raise the temperature of approximately one-fifth of the weight of the charge to a temperature approximately equal to that of the steam stream, whereby the aforesaid enzymes and other active substances in the outer portion of the wheat berry are weakened without shortening the gluten, attacking the starch or substantially increasing the moisture content.

2. A method of treating wheat berries prior to milling for the purpose of weakening the enzymes and other active substances in the outer portions of the wheat, which comprises introducing grain, which has not been moistened immediately before the treatment, at storage temperature into a closed chamber, treating the wheat for a period of a few minutes to a constant quality stream of saturated steam at its reduced pressure and of a temperature of 130° F. to 160° F., and controlling the flow of the steam during this short treatment period by a constant supply of fresh steam and constant evacuation of exhaust steam in such a manner that only sufficient steam is passed through the chamber as to raise the temperature of approximately one-fifth of the weight of the charge to a temperature approximately equal to that of the steam stream, whereby the aforesaid enzymes and other active substances in the outer portion of the wheat berry are weakened without shortening the gluten, attacking the starch or substantially increasing the moisture content.

HERMANN GRAUMANN.